F. Kemlo,

Fish Hook.

No. 94,895.  Patented Sep. 14, 1869.

Witnesses.
A. Ruppert.
E. F. Clausen.

F. Kemlo
Inventor.
D. P. Holloway & Co.
Attys.

United States Patent Office.

FRANCIS KEMLO, OF BOSTON, MASSACHUSETTS.

Letters Patent No. 94,895, dated September 14, 1869.

IMPROVEMENT IN FISH-HOOKS.

The Schedule referred to in these Letters Patent and making part of the same.

*To all whom it may concern:*

Be it known that I, FRANCIS KEMLO, of Boston, in the county of Suffolk, and State of Massachusetts, have invented a new and useful Improvement in Fish-Hooks; and I do hereby declare that the following is a full, clear, and exact description thereof, reference being had to the annexed drawings, making part of this specification, in which—

The same letters in the two figures indicate identical parts.

Figure 1:
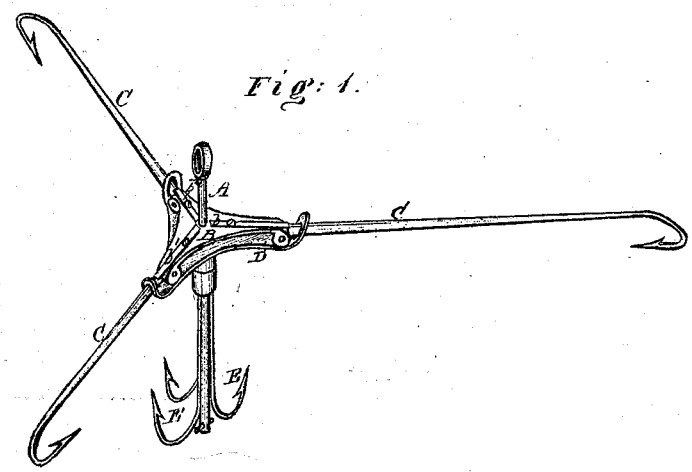
Figure 1 is a perspective view of my improved fish-hook, showing the position of the bait and grappling-hooks when "set."
Figure 2:
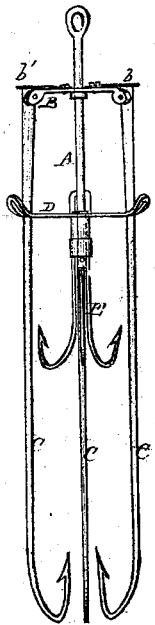
Figure 2 is an elevation, the bait-hooks having been pulled down on the stem, thereby closing the grappling-hooks.

My invention relates to fish-hooks of that class which are constructed with one or more bait-hooks and a series of grappling-hooks, distended when "set," and made to come together and grapple the fish as it pulls on the bait-hooks.

My improvement consists in the combination of the parts of which the device is composed, as hereinafter more fully described.

To enable those skilled in the art to make and use my invention, I will proceed to describe its construction and operation.

A, in the drawings, represents a stem or bar of metal, to the upper end of which the line may be attached.

A suitable distance from its lower end, say about three inches, it has secured upon it a triangular plate, B, the corners of which are to be bossed on the under side. These bosses are slotted, for the reception of the ends of the grappling-hooks, which are pivoted thereto.

$b$ $b^1$ $b^2$ are springs, secured upon the upper face of the plate B, which shall act upon the ends of the grappling-hooks in such a manner as to hold them, when "set," in the position shown in fig. 1, and aid in bringing their outer hook-ends together, when acted upon by the sliding bait-hooks, with a quick movement, thereby imparting sufficient force to them to enter the body of a fish.

The grappling-hooks C, of which I regard three as a suitable number, are formed with elongated shanks, so as to make them, say, from eight to nine inches in length. The upper portion of their shanks is to be flattened and perforated, to prepare them to be pivoted in the bosses of the plate B, their ends being made square. They are pivoted in the said plate in such a manner that their upper edges shall be about flush with the upper surface of such plate, when in the position shown in fig. 1, the springs $b$ $b^1$ $b^2$ laying upon them, and holding them in this position.

In order to turn the hooks down, that is, to close them, some little force will have to be exerted to overcome the action of the springs, which bear upon the upper corners of the shanks, resisting their turning, until they have reached a certain point, when these corners begin to move in direction of the action of the springs, and thus permit these latter to assist in bringing the hooks together.

D is another triangular plate, provided in its centre with a tubular hub, and placed upon the stem A below the plate B, sliding freely on said stem, through the lower end of which a pin is passed, projecting on each side, to prevent the plate from sliding off. The corners of this plate are curved upward for a short distance, and provided with elongated holes, through which the shanks of the grappling-hooks pass, such curved formation being necessary to admit of the "setting" of these hooks, which, when in the position shown in fig. 1, support the plate in its elevated position.

Three short bait-hooks, E, are attached to the hub of the plate D. The bait is to be placed on these hooks, and the whole device arranged as shown in fig. 1, before it is lowered into the water. By a slight pull of a fish, these hooks, together with the plate D, will be made to slide down on the stem, whereby the grappling-hooks are brought together with a quick movement, entering the body of the fish, and making its escape almost impossible.

Having thus described my invention,

What I claim, and desire to secure by Letters Patent, is—

The combination of the stem A, plate B, springs $b$ $b^1$ $b^2$, grappling-hooks C, plate D, and bait-hooks E, all arranged to operate substantially in the manner set forth.

In testimony whereof, I have signed my name to this specification, in the presence of two subscribing witnesses.

FRANCIS KEMLO.

Witnesses:
  GEORGE W. GOSS,
  FRANCIS A. PERRY.